W. LANGE.
SPRAYING NOZZLE.
APPLICATION FILED MAR. 12, 1919.
1,390,047.
Patented Sept. 6, 1921.
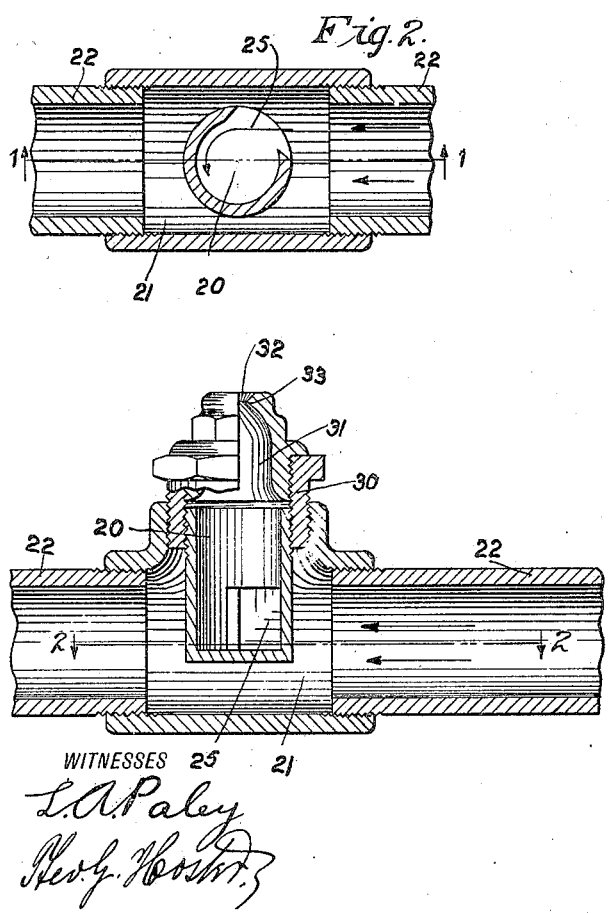
WITNESSES
L. A. Paley
Rev. G. Hoch
INVENTOR
WILLIAM LANGE
BY
ATTORNEYS

UNITED STATES PATENT OFFICE.

WILLIAM LANGE, OF NEW YORK, N. Y.

SPRAYING-NOZZLE.

1,390,047. Specification of Letters Patent. Patented Sept. 6, 1921.

Application filed March 12, 1919. Serial No. 282,060.

*To all whom it may concern:*

Be it known that I, WILLIAM LANGE, a citizen of the United States, and a resident of the city of New York, (Stapleton, borough of Richmond, in the county of Richmond and State of New York, have invented a new and Improved Spraying-Nozzle, of which the following is a full, clear, and exact description.

The object of the invention is to provide a new and improved spraying nozzle designed for use in connection with refrigerating apparatus and the like and arranged to insure a thorough spraying of the hot water or other liquid into the air to effect a rapid cooling thereof for reuse of the liquid in the apparatus. Another object is to provide a spraying nozzle which is exceedingly simple and durable in construction and not liable to get out of order easily.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both the views.

Figure 1 is a longitudinal central section of a pipe line provided with the improved spraying nozzle, the section being on the line 1—1 of Fig. 2; and Fig. 2 is a sectional plan view of the same on the line 2—2 of Fig. 1.

As shown in the drawing the spraying nozzle has a circular chambered member 20 extending within a T-fitting 21 connected with a pipe line 22, and the chambered member 20 is provided at one side with a tangential inlet opening 25 to allow some of the water passing through the pipe line to pass by way of the said opening 25 into the said chambered member 20 to receive a whirling action therein. The upper end of the chambered member 20 screws in a sleeve 30 screwed into the top of the T-fitting 21, and in the sleeve 30 screws a cap 31 which is gradually reduced and terminates in an outlet opening 32, the annular wall 33 of which is V-shaped in cross section so as to cause the water to be divided minutely and sprayed into the surrounding air. It is understood that the water passing into the chambered member 20 and receiving the whirling action then passes up through the cap 31 and through the outlet 32 into the air in a minutely sprayed condition to insure a rapid cooling of the water.

The spraying nozzle shown and described is very simple in construction and can be readily attached to a pipe line.

Having thus described my invention, I claim as new and desire to secure by Letters Patent:—

1. A spraying nozzle adapted to be interposed in a pipe line, comprising an interiorly and exteriorly threaded sleeve, said exterior threads being adapted to be secured in a threaded opening of the pipe line, a chamber having open upper end and a closed lower end and provided in one side at the closed end with a tangential inlet opening, said chamber having its upper end exteriorly threaded for engagement with the interior threads of the lower end of the sleeve, and a cap having an exteriorly threaded lower end screwing into the upper end of the sleeve, said cap being gradually reduced and having an outwardly flared outlet in its reduced top.

2. In combination, an interiorly threaded T-fitting adapted to be interposed in a pipe line, and a spraying nozzle comprising an interiorly and exteriorly threaded sleeve screwing into the stem of said fitting, a chambered member having an exteriorly threaded upper end screwing into the sleeve and projecting into the path of the liquid flowing through the pipe, said chambered member having an open top and closed bottom and provided with a single tangential inlet in line with the flow of the liquid, and a cap secured in the sleeve and having an outlet in its top.

WILLIAM LANGE.